(12) United States Patent
Clark et al.

(10) Patent No.: US 6,881,358 B1
(45) Date of Patent: Apr. 19, 2005

(54) MOLD APPARATUS AND METHOD

(75) Inventors: Rodney L. Clark, Gurley, AL (US);
John P. Rauseo, Huntsville, AL (US);
Gregg T. Borek, Huntsville, AL (US)

(73) Assignee: MEMS Optical Inc., Huntsville, AL (US)

( * ) Notice: Subject to any disclaimer, the term of this patent is extended or adjusted under 35 U.S.C. 154(b) by 0 days.

(21) Appl. No.: 09/347,427

(22) Filed: Jul. 6, 1999

(51) Int. Cl.[7] .............................................. B29D 11/00
(52) U.S. Cl. ........................ 264/2.5; 216/26; 264/1.36; 249/119; 425/808
(58) Field of Search ...................... 264/2.5, 1.1, 1.31, 264/1.32, 1.33, 334, 1.36, 1.37; 425/808, 810; 249/119; 216/24, 26

(56) References Cited

U.S. PATENT DOCUMENTS

| | | | |
|---|---|---|---|
| 2,745,138 A | 5/1956 | Beattie | 18/26 |
| 4,560,342 A * | 12/1985 | Ishida et al. | 264/1.1 |
| 4,737,447 A | 4/1988 | Suzuki et al. | 430/321 |
| 4,751,029 A | 6/1988 | Swanson | 264/40.4 |
| 4,828,769 A * | 5/1989 | Maus et al. | 264/1.31 |
| 4,840,754 A | 6/1989 | Morgan | 264/2.2 |
| 4,874,561 A | 10/1989 | Spector | 264/1.1 |
| 5,112,207 A * | 5/1992 | Pinsonneault | 264/334 |
| 5,218,471 A | 6/1993 | Swanson et al. | 359/565 |
| 5,348,616 A | 9/1994 | Hartman et al. | 156/643 |
| 5,512,221 A * | 4/1996 | Maus et al. | |
| 5,538,674 A * | 7/1996 | Nisper et al. | 264/1.31 |
| 5,575,962 A | 11/1996 | Takahashi | 264/2.5 |
| 5,618,474 A | 4/1997 | Liau et al. | 264/1.1 |
| 5,728,324 A | 3/1998 | Welch et al. | 264/2.5 |
| 5,825,741 A | 10/1998 | Welch et al. | 369/112 |
| 5,837,156 A | 11/1998 | Cumming | 249/119 |
| 5,876,642 A | 3/1999 | Calderini et al. | 264/2.5 |
| 5,938,989 A * | 8/1999 | Hambright | 264/1.32 |

OTHER PUBLICATIONS

T. Fujita et al., "Blazed gratings and Fresnel lenses fabricated by electron–beam lithography", Optics Letters, vol. 7. No. 12, Dec. 1982, pp. 578–580.

* cited by examiner

Primary Examiner—Mathieu D. Vargot
(74) Attorney, Agent, or Firm—Keady, Olds & Maier, PLLC

(57) ABSTRACT

A mold apparatus is arranged to produce molded optical elements. The apparatus includes a first mold unit for defining mold cavities and flow passageways, and a second mold unit having a patterned surface for sealing against the first unit. The patterned mold surface may be formed with a plurality of optical patterns, and mold pins may be used to complete the mold cavities. The patterned surface may be formed on a flat metal puck. The puck may be replaced by another puck insert so that the apparatus can be used to produce products having different optical characteristics. Other parts of the apparatus may be changed out to produce molded optical elements of various sizes and shapes. A variety of techniques are described for forming micro-refractive, diffractive and/or other patterns in the metal puck surface.

13 Claims, 2 Drawing Sheets

MOLD APPARATUS AND METHOD

BACKGROUND OF THE INVENTION

1. Field of the Invention

The present invention relates generally to molding systems, including devices, apparatus and methods for producing molded optical elements such as lenses. More particularly, the present invention relates to an injection molding apparatus for forming optically transmissive products with micro-refractive and/or diffractive surfaces.

2. Discussion of the Related Art

It is has been suggested to form a mold apparatus by etching diffractive patterns in a flat substrate, cutting the patterns from the substrate, and applying them to mold pins. The pins are used in mold cavities to form molded products with the desired patterns. According to this technique, a separate optical pattern is provided for each mold pin. The technique is disadvantageous because it requires the step of cutting the mold pins from the patterned substrate.

It has also been suggested to form a mold apparatus with a flat portion and a "stamper" opposed to the flat portion. Audio or video data may be digitally patterned in the stamper by lithography. The stamper is used to define disc-shaped molded products. This approach is disadvantageous because it produces only one product per injection mold cycle. Additional processing steps are required to form multiple products per mold cycle.

SUMMARY OF INVENTION

The present invention overcomes to a great extent the deficiencies of the prior art. The present invention relates to a mold apparatus for producing molded optical elements. The apparatus includes a first mold unit for defining mold cavities and flow passageways, and a second mold unit having a patterned surface for sealing against the first unit. The patterned mold surface may be formed with a plurality of optical patterns.

According to another aspect of the invention, mold pins are used to define the mold cavities. The mold pins are located in the first unit so as to be opposed to the optical patterns in the mold surface. According to a preferred embodiment of the invention, the first mold unit has a front face opposed to the mold surface of the second mold unit, and the mold passageways are formed in the front face.

According to another aspect of the invention, the first mold unit is a removable cutter unit, and the apparatus is arranged to receive other cutter units to produce molded products of different sizes and shapes.

According to another aspect of the invention, the mold surface is in the form of a metal disc-shaped puck. The metal puck may be removed and replaced by like-shaped metal pucks having different optical mold patterns. The various metal pucks may be readily interchangeable so that the apparatus can be used to produce molded elements having different optical characteristics.

According to another aspect of the invention, the mold apparatus may be used to form transparent or optically transmissive lenses and other optical elements or devices. The optical elements may have micro-refractive and/or diffractive patterns molded into first surfaces and planar opposite surfaces. The patterned surfaces may be formed by the metal puck. The planar opposite surfaces may be formed by the mold pins. The molded products may be formed of optical-grade polycarbonate or other suitable materials.

The present invention also relates to a method of making molded optical elements and devices. In a preferred embodiment of the invention, the method involves an injection molding process. The method may also involve changing or replacing components of the mold apparatus to produce elements of different sizes, shapes and/or optical characteristics.

The present invention also relates to the production of analog topographic patterns and other patterns on a metal puck for use in a mold apparatus. The patterns may be spaced apart from each other on the otherwise flat surface of the metal puck. According to one aspect of the invention, the metal puck is formed by using an analog gray scale mask to pattern photoresist material. In alternative embodiments of the invention, the patterns are formed by ion milling or electron beam lithography.

According to the present invention, many molded products may be formed by a single mold apparatus during a single injection cycle. The optical surfaces of the multiple products may be defined by a single patterned puck. There is no need to separate the products from each other after molding. The products may be formed individually and simultaneously within a single apparatus. The same apparatus may be used to produce molded elements of different sizes, shapes and/or optical characteristics by changing out the respective mold surfaces.

These and other objects and advantages of the invention may be best understood with reference to the following detailed description of preferred embodiments of the invention, the appended claims and the several drawings attached hereto.

DETAILED DESCRIPTION OF PREFERRED EMBODIMENTS

Figure 1:
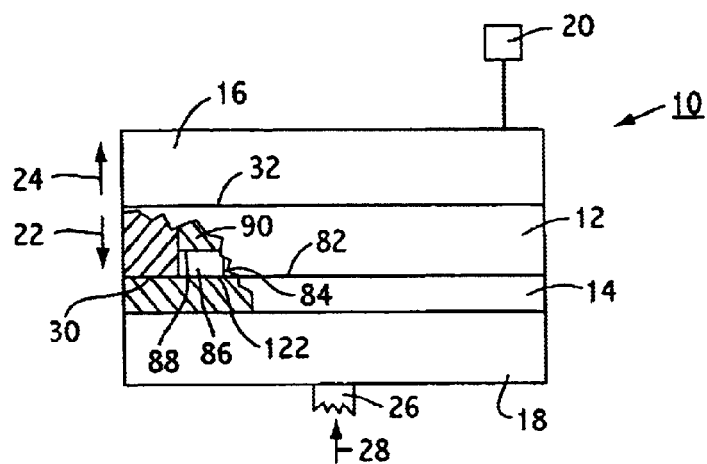
FIG. 1 is a partially broken-away side view of a mold apparatus constructed in accordance with a preferred embodiment of the present invention.

Referring now to the drawings, where like reference numerals designate like elements, there is shown in FIG. 1 a mold apparatus 10 constructed in accordance with a preferred embodiment of the present invention. The mold apparatus 10 has a cutter unit 12 and a disc-shaped metal puck 14. The cutter unit 12 may be formed of machined metal or another suitable material. The cutter unit 12 and the puck 14 cooperate to define mold cavities 86 and flow passageways 84 for use in an injection molding process, as described in more detail below. The cutter unit 12 and the puck 14 are removably attached to respective mold units 16, 18.

In the illustrated embodiment, the first mold unit 16 is operated by a suitable operating mechanism 20. The mechanism 20 may be used to move the mold unit 16 and the cutter unit 12 toward and away from the puck 14 in the directions of arrows 22, 24. If desired, the mechanism 20 also may be used to control the positions of cutter pins 90 within the cutter unit 12, as described in more detail below. The second mold unit 18 may be fixed in place or movable toward and away from the cutter unit 12. The present invention should not be limited to the specific instrumentalities shown and described in detail herein.

In operation, the cutter unit 12 is attached to the first mold unit 16 and the puck 14 is attached to the second mold unit 18. Then the operating mechanism 20 moves the cutter unit 12 into face-to-face sealing contact with the puck 14 to define the mold cavities 86. Then, molten plastic (not shown) is injected into the apparatus 10 through an inlet conduit 26 in the direction of arrow 28. The plastic material may be polycarbonate, for example. The plastic fills the mold cavities 86 and solidifies to form diffractive optical elements.

Then the cutter unit 12 is separated from the puck 14 by the operating mechanism 20, and the molded products (not shown) are removed from the mold cavities 86. In a preferred method of operation, the apparatus 10 remains closed until the products are sufficiently solid to be removed from the cutter unit 12 and handled without damage. If desired, a replacement cutter unit and/or a replacement puck (not shown) may be substituted for the original components 12, 14 to reconfigure the apparatus 10 to form molded optical elements of different sizes and/or different optical characteristics.

Figure 2:
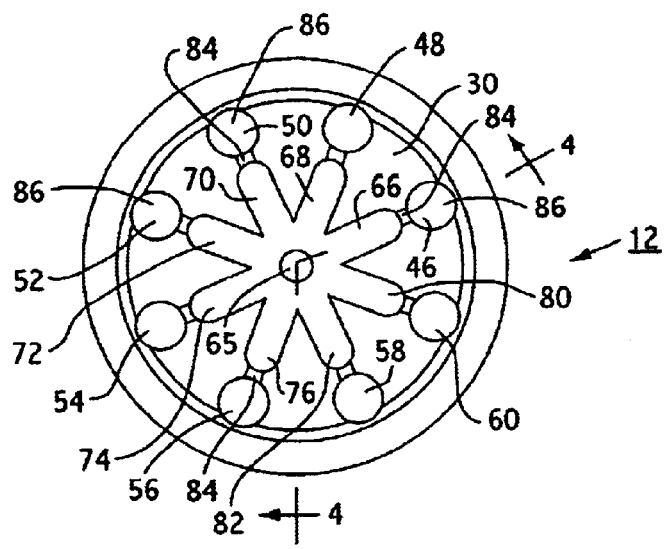
FIG. 2 is a front view of a cutter unit for the apparatus of FIG. 1.
Figure 3:
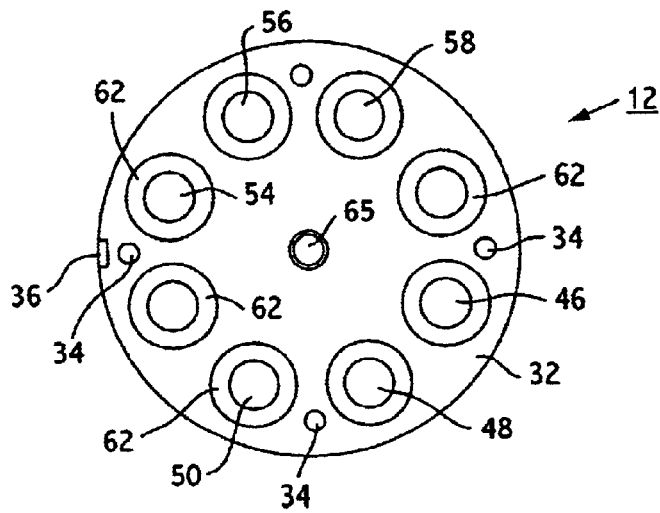
FIG. 3 is a rear view of the cutter unit of FIG. 2.

Referring now to FIGS. 2 and 3, the cutter unit 12 has a front face 30 and a back face 32. The front face 30 is sealed against the puck 14 when the apparatus 10 is in the closed position shown in FIG. 1. The back face 32 of the cutter unit 12 is attached to the first mold unit 16. Suitable structures, such as threaded openings 34, are provided for removably connecting the cutter unit 12 to the first mold unit 16. A notch 36 may be provided for aligning the cutter unit 12 with respect to the apparatus 10 during assembly. If desired, the cutter unit 12 may be removed from the mold unit 16 and replaced with another cutter unit that defines mold cavities 86 of different shapes and/or sizes.

Mold openings 46, 48, 50, 52, 54, 56, 58, 60 extend axially through the cutter unit 12. Each mold opening 46–60 may extend from the front face 30 of the cutter unit 12 to the back face 32. In the illustrated embodiment, each mold opening 46–60 has the same cylindrical construction. The present invention should not be limited, however, to the specific embodiments shown and described herein. Thus, for example, some of the mold openings may have different diameters than others, and/or some of the openings may be square or rectangular. If desired, each mold opening 46–60 may be provided with a counter bore 62 (FIG. 3) for accommodating suitable pin-handling equipment as described in more detail below.

A resin flow passageway 64 (FIG. 6) extends axially through the center of the puck 14. In addition, radial passageways 66, 68, 70, 72, 74, 76, 78, 80 (FIG. 2) are formed in the front face 30 of the cutter unit 12. The radial passageways 66–80 are in fluid communication with the axial passageway 64 when the mold apparatus 10 is in the closed position shown in FIG. 1. In the closed position (FIG. 1), the radial passageways 66–80 are enclosed and sealed by the front face 82 of the puck 14. In the illustrated embodiment, the enclosed passageways 66–80 have semi-circular cross-sectional configurations.

During the injection molding process, molten resin flows through the inlet conduit 26, then through the axial passageway 64, then through the radial passageways 66–80 (formed between the cutter unit 12 and the puck 14), and from there into the mold openings 46–60. Necked-down gate regions 84 may be formed between the radial passageways 66–80 and the respective mold openings 46–60. The necked-down gate regions 84 have reduced cross-sectional flow areas to facilitate removal of finished products from the associated runner system (scrap). A scrap removal pin (not shown) may be located in an axial opening 65. The scrap removal pin may be used at the conclusion of the injection molding process to assist in the removal of the runner system from the cutter unit 12.

It should be understood that the use of the word "cutter" in the term "cutter unit" does not necessarily mean that the unit 12 performs a cutting function. In the illustrated embodiment, the cutter unit 12 is intended to form the illustrated mold cavities. The cutter unit 12 is not used to cut molded plastic into finished products.

Figure 4:
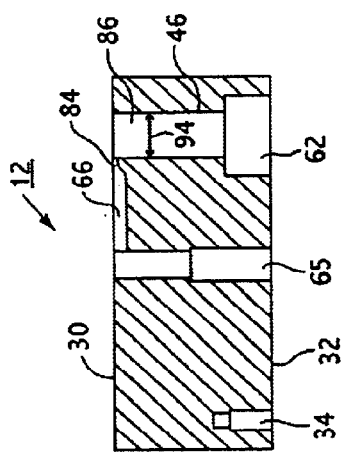
FIG. 4 is a cross-sectional view of the cutter unit of FIG. 2, taken along line 4—4.
Figure 5:
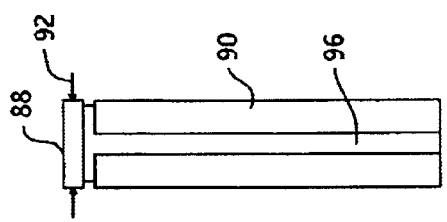
FIG. 5 is a side view of a cutter pin for the apparatus of FIG. 1.

The mold cavities 86 are formed in the mold openings 46–60. When the apparatus 10 is in the closed position, the bottom surfaces of the mold cavities 86 are defined by the puck 12. The puck 12 forms optical patterns in the bottom surfaces of the molded products as described in more detail below. The side walls of the mold cavities 86 (FIG. 4) are defined by the sides of the mold openings 46–60. In the illustrated embodiment, the mold openings 46–60 have cylindrical side walls. The top surfaces of the mold cavities 86 are defined by the front end faces 88 of suitable mold pins 90 (FIG. 5). A separate mold pin 90 may be provided for each mold opening 46–60.

The diameters 92 of the pins 90 may be the same as the internal diameters 94 (FIG. 4) of the mold openings 46–60. The pins 90 are axially slidable within the mold openings 46–60. In the illustrated apparatus 10, there are eight mold cavities 86 and eight pins 90 so that eight optical elements (not shown) can be formed in each injection molding cycle. More or fewer mold cavities may be employed, however. The present invention should not be limited to the specific arrangements shown in the drawings or described herein.

The front end faces 88 of the mold pins 90 may be smooth or mirrored. In a preferred embodiment of the invention, the end faces 88 are formed of polished metal. The polished faces 88 form corresponding planar surfaces in the finished products. In an alternative embodiment of the invention, the end faces 88 may be provided with an optical pattern to produce products with patterns on both sides. In other embodiments of the invention, the faces 88 may have curvatures to form molded products with convex or concave surfaces. The thicknesses of the optical elements formed by the apparatus 10 may be defined by the lengths of the pins 90. If relatively long pins 90 are used, the ends 88 of the pins 90 are located close to the puck 14 to form relatively thin optical products. Shorter pins 90 may be used to form thicker products.

After the optical elements are formed within the mold cavities 86, and the cutter unit 12 is moved away from the puck 14, the pins 90 may be used to push the molded elements out of the cutter unit 12. The positions and movements of the pins 90 may be controlled by the operating mechanism 20. The pins 90 are attached to the operating mechanism 20 by suitable means (not shown) which may be received within the counterbores 62. Suitable slots 96 (FIG. 5) may be provided to prevent rotation of the pins 90 with respect to the actuating mechanism 20 and/or the cutter unit 12.

Figure 6:
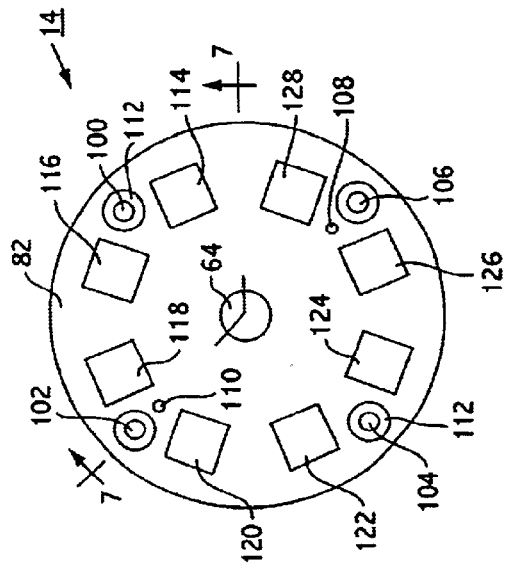
FIG. 6 is a front view of a puck for the mold apparatus of FIG. 1.
Figure 7:
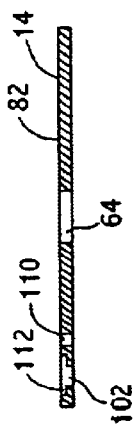
FIG. 7 is a cross-sectional view of the puck of FIG. 6, taken along line 7—7.

The front face 82 of the puck 14 is shown in FIG. 6. Suitable bolt holes 100, 102, 104, 106 may be used to connect the puck 14 to the second mold unit 18. In addition, openings 108, 110 may be arranged to receive alignment pins (not shown) extending from the second mold unit 18 to precisely align the puck 14 within the apparatus 10. If desired, countersunk portions 112 (FIG. 7) may be machined into the holes 100–106 to receive bolt heads (not shown). This way, the front face 82 of the puck 14 fits flat against the front face 30 of the cutter unit 12 when the puck 14 is mounted in the apparatus 10.

According to a preferred embodiment of the invention, micro-refractive or diffractive optical patterns 114, 116, 118, 120, 122, 124, 126, 128 are formed in the front face 82 of the puck 14. Each pattern 114–128 is aligned with respect to the mold openings 46–60. The patterns 114–128 are spaced apart from each other. The patterns 114–128 are formed on only one side of the puck 18. Except for the patterns 114–128, the face 82 of the puck 14 may be perfectly flat. Such flatness makes it easier to use lithographic and other techniques to form the desired patterns 114–128.

In a preferred embodiment of the invention, the patterns 114–128 are identical to each other, within each puck 12. Replacement pucks for the apparatus 10 may be provided with different etched patterns to form products with different optical characteristics. The replacement pucks may have the same connection and alignment structure 100–110 so as to be readily installed into the apparatus 10. In addition, the replacement pucks may have the same arrangement of patterns as the illustrated puck 14 such that the optical patterns in the replacement pucks are aligned with the mold openings 46–60.

In operation, the cutter unit 12 is pressed tightly against the face 82 of the puck 14, causing the individual mold cavities 86 to be defined by the mold openings 46–60, the front polished ends 88 of the pins 90, and the puck patterns 114–128. After the desired number of molded products are formed, the puck 14 may be removed from the second mold unit 18 and replaced with a different puck insert having the same overall configuration but different optical patterns opposed to the mold openings 46–60.

Molded products formed by the illustrated apparatus may have planar surfaces on one side formed by the polished end faces 88 of the pins 90 and patterned surfaces on the other side formed by the patterns 114–128 in the puck 14. The products may be formed of a suitable transparent or optically transmissive material. Thus, the finished products may be used as micro-refractive and/or diffractive lenses. As described in more detail below, the patterns 114–128 may be formed by photolithographic mastering with analog relief patterns.

The patterns 114–128 may be formed in the puck surface 82 by a variety of lithographic and other techniques, including the techniques disclosed in U.S. patent application Ser. No. 08/788,289, filed Jan. 24, 1997. The entire disclosure of U.S. patent application Ser. No. 08/788,289 is expressly incorporated herein by reference.

In addition, the patterns 114–128 may be formed by an analog gray scale mask technique, with the puck surface 82 being patterned by ultraviolet (UV) lithography. According to this technique, a metal surface is covered with photoresist. Then an analog gray scale mask is used to pattern the photoresist either by contact printing or by reduction lithography. After the photoresist is patterned, it is developed according to known procedures. The relief pattern on the photoresist is the negative of the desired mold pattern. Then at least three different techniques may be employed to complete the puck 14.

In a first completion technique, the patterned photoresist is metalized. The metalized substrate is then inserted into an electroplating bath. A metal surface is grown on the substrate. The process is stopped when the substrate attains the desired thickness. The original substrate is removed and the photoresist is removed. The back side of the patterned and electroformed disc is then polished flat to form the puck 14.

In a second completion technique, the patterned photoresist-on-metal structure is placed in an ion milling machine. The ion milling machine transfers the analog pattern in the photoresist directly into the metal material to form the patterned puck 14.

In a third completion technique, a non-metallic substrate is etched in a reactive ion etching (RIE) chamber. The etched substrate is then metalized, and then the electroformed product is removed from the non-metallic substrate. The back side of the patterned disc is then polished flat to form the finished puck 14 for the apparatus 10.

As an alternative to the analog gray scale mask technique described above, the puck 14 may be formed with an analog profile by a focused ion beam (FIB) apparatus. According to this aspect of the invention, a metal substrate is used without photoresist. The desired refractive or diffractive analog pattern is milled or written directly into the metal material of the puck 14. The desired patterns 114–128 may be formed either by removal or deposition of metallic material.

According to yet another method of making the puck 14, analog profiles may be formed by a direct write technique with electron beam lithography. According to this aspect of the invention, the patterns 114–128 are generated by electron beam lithography with the exposure of the electron beam being controlled at each position to form a relief pattern in the electron resist. The photoresist is then developed and the resulting patterned substrate is then used to create the puck 14 according to any one of the three completion techniques described above.

The above description and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the invention.

What is claimed as new and desired to be protected by Letters Patent of the United States is:

1. A mold apparatus for producing molded optical elements, said apparatus comprising:
    a first mold unit for defining mold cavities and flow passageways;
    a second mold unit having an integrated mold surface for sealing against said first unit, said integrated mold surface containing a plurality of patterns for molding optical patterns in the optical elements;
    a mechanism for moving said first unit toward said second unit to form said flow passageways; and
    mold pins for defining said mold cavities, said mold pins being located in said first mold unit.

2. The mold apparatus of claim 1, wherein said first mold unit has a front face opposed to said mold surface of said second mold unit, and wherein said flow passageways are formed in said front face.

3. A method for making molded optical elements, said method comprising the steps of:

providing a metal puck with a plurality of optical patterns;

locating said metal puck against a mold surface to seal a plurality of mold cavities and flow passageways formed upon said mold surface; and subsequently, molding optical elements within said mold cavities such that said optical patterns of said metal puck are formed in said optical elements; and moving said mold surface toward said metal puck to form said flow passageways; and using mold pins to define the thicknesses of said mold cavities.

4. The method of claim 3, further comprising the step of flowing molten resin across said mold surface in radial directions toward such cavities.

5. The method of claim 4, further comprising the step of using said metal puck to enclose said flow passageways.

6. A method of making a mold apparatus, said method comprising the steps of:

forming a plurality of optical patterns in a metal puck;

locating said metal puck against a mold unit to seal a plurality of mold cavities and flow passageways formed upon said mold surface; and locating mold pins in said mold unit to define the thickness of said mold cavities.

7. The method of claim 6, wherein said step of forming said patterns includes the step of using an analog gray scale mask to pattern photoresist material.

8. The method of claim 6, wherein said step of forming said patterns includes ion milling.

9. The method of claim 6, wherein said step of forming said pattern includes electron beam lithography.

10. The apparatus of claim 1, wherein the integrated mold surface is a single continuous surface that patterns multiple optical elements.

11. The apparatus of claim 10, wherein the mold pins enter the mold cavities and can be varied in length to change the thickness of the mold cavities.

12. The method of claim 3, wherein the optical patterns on the metal puck is continuous multiple optical elements.

13. The method of claim 6, wherein the optical patterns on the metal puck is continuous multiple optical elements.

* * * * *